United States Patent [19]

Nishimori et al.

[11] Patent Number: 4,590,079

[45] Date of Patent: May 20, 1986

[54] METHOD AND COMPOSITION FOR PREVENTING DISCOLORATION OF MEAT PRODUCTS

[75] Inventors: Katsuhiko Nishimori, Kitakatsuragi; Yukihiro Nakao, Tondabayashi, both of Japan

[73] Assignee: Takeda Chemical Industries, Ltd., Osaka, Japan

[21] Appl. No.: 688,144

[22] Filed: Dec. 31, 1984

[30] Foreign Application Priority Data

Jan. 9, 1984 [JP] Japan ................................. 59-2333

[51] Int. Cl.$^4$ ........................... A23B 4/12; A23B 4/14; A23L 1/272
[52] U.S. Cl. ................................. 426/265; 426/332; 426/641; 426/652
[58] Field of Search ............... 426/265, 266, 332, 641, 426/652, 650

[56] References Cited

U.S. PATENT DOCUMENTS 2,634,211   4/1953   Komarik .......................... 426/265

FOREIGN PATENT DOCUMENTS

| 143205 | 8/1980 | Fed. Rep. of Germany ...... 426/652 |
| 159141 | 2/1983 | Fed. Rep. of Germany ...... 426/652 |
| 51-32735 | 3/1976 | Japan . |
| 21053 | 6/1976 | Japan ................................. 426/652 |
| 48783 | 12/1980 | Japan ................................. 426/652 |
| 58-43761 | 3/1983 | Japan . |

*Primary Examiner*—Arthur L. Corbin
*Attorney, Agent, or Firm*—Wenderoth, Lind & Ponack

[57]   ABSTRACT

Discoloration of meat products can be prevented by incorporating ascorbic acids, cystine and/or cysteine, and aspartic acid, and optionally a starch hydrolyzate with a dextrose equivalent of 5 to 30 into meat products.

9 Claims, No Drawings

METHOD AND COMPOSITION FOR PREVENTING DISCOLORATION OF MEAT PRODUCTS

This invention relates to a method for preventing discoloration of meat products and a composition therefor.

It is generally believed that hams, sausages, bacons and other edible meat products made of animal proteins such as those of animal and fish meats should have attractive colors as well as palatable textures and flavors. For this reason, nitrites and nitrates have heretofore been employed to impart attractive colors to such foods, and L-ascorbic acid or erythorbic acid, inclusive of the sodium salt thereof, nicotinamide or the like has been additionally employed in expectation of the reduction or antioxidation effect as an auxiliary coloring agent or anti-discoloration agent. The addition of cysteine, glutathione or the like has also been reported. However, in view of the increased variety of merchandise epitomized by the recent advent of pre-sliced meat products, these known agents are not fully effective and satisfactory as anti-discoloration agents.

Under the circumstances the present inventors explored the possible methods for preventing discoloration of meat products and found that the addition of ascorbic acids, cystine and or cysteine, and aspartic acid to meat products is effective in the prevention of discoloration of such products. The finding was followed by further research which has culminated in the perfection of this invention.

This invention is, therefore, concerned with (1) a method of preventing discoloration of meat products characterized by adding (a) ascorbic acids,(b) cystine and/or cysteine, and (c) aspartic acid to such foods at any stage of their production, (2) a method for preventing discoloration of meat products characterized by incorporating a starch hydrolyzate with a dextrose equivalent of 5 to 30 in addition to said components (a), (b) and (c), (3) a composition for preventing discoloration of meat products characterized by containing (a) ascorbic acids, (b) cystine and/or cysteine, and (c) aspartic acid, and (4) a composition according to (3) wherein a starch hydrolyzate with a dextrose equivalent of 5 to 30 is additionally contained.

The term 'meat products' is used herein to denote fresh or cured animal, poultry and fish meats and processed foods made of such meats.

The animal meats include pork, beef, horse meat, sheep meat, mutton, rabbit meat, whale meat, etc.; the poultry meats include chicken, turkey meat, etc.; and fish meats include the fleshes of tuna, swordfish, horsemackerel, etc.

The processed foods from fresh meats mentioned above include hams, sausages, bacons, fish hams, fish sausages, etc. to mention but a few.

The term "ascorbic acids" as used herein means any and all of L-ascorbic acid and erythorbic acid and edible salts thereof (e.g. the corresponding sodium, potassium and calcium salts), which may be used in powdery form or coated powder form. For coating the powder, particles of L-ascorbic acid, erythorbic acid or the like are coated with an edible coating agent which does not melt at temperatures below 40° C. but melts at 40° C. or higher temperature by a procedure known per se. An exemplary coating procedure consists in spraying the particles with a molten coating agent by means of a rotary disc sprayer. The coating agent may for example be a hydrogenated animal oil such as hydrogenated tallow oil, hydrogenated spermaceti, etc. or a hydrogenated vegetable oil such as hydrogenated soybean oil, hydrogenated palm oil, etc. In addition, glycerin fatty acid esters, sorbitan fatty acid esters, etc. may also be employed. The proportion of such coating agent is about 0.05 to 5 weight parts, preferably 0.5 to 5 weight parts, relative to one weight part of L-ascorbic acid or the like.

The term "cystine" as used herein means any and all of L-cystine and various edible salts thereof (e.g. L-cystine hydrochloride) and cystine-containing hydrolyzates of keratin.

The term "aspartic acid" as used herein means any and all of L-aspartic acid and various edible salts thereof (e.g. monosodium L-aspartate).

It is preferable that cystine, cysteine and aspartic acid be used in powdery form.

With regard to the proportions of ascorbic acids, cystine and/or cysteine, and aspartic acid, about 0.1 to 5 weight parts, preferably about 0.2 to 2 weight parts, of cystine and/or cysteine and about 0.1 to 5 weight parts, preferably about 0.2 to 2 weight part, of aspartic acid are used to one weight part of ascorbic acids.

The use of a starch hydrolyzate with a dextrose equivalent of 5 to 30 in combination with the above components results in a further desirable effect according to this invention. The term "starch hydrolyzate" means any and all of hydrolyzates obtainable by hydrolysis of starch with an enzyme such as $\alpha$-amylase, $\beta$-amylase, etc. or an acid such as oxalic acid, hydrochloric acid, etc. to the aforementioned dextrose equivalent (DE). The term dextrose equivalent is the glucose equivalent of the reducing sugars in a starch hydrolyzate and indicates the degree of hydrolysis of starch or the degree of progress of saccharification. Crystalline glucose which is nearly pure, for instance, has a DE value approximating 100. A starch hydrolyzate with a dextrose equivalent of 5 to 30 is used in a proportion of about 0.2 to 8 weight parts, preferably about 0.5 to 4 weight parts, relative to 1 weight part of the ascorbic acids.

The advantages of using a starch hydrolyzate in combination are that the stability of components of the composition is enhanced and that the dispersibility of the components at addition is improved. The result is that the effect of preventing discoloration of meat products is increased remarkably and uniformly.

The level of addition of ascorbic acids with respect to meat products is about 0.02 to 0.1 weight percent, preferably about 0.03 to 0.08 weight percent.

The levels of addition of cystine and/or cysteine and aspartic acid depend on the proportion of ascorbic acids relative to meat products and the specified amounts thereof relative to ascorbic acids.

The level of addition of the anti-discoloration composition according to this invention is preferably about 0.03 to 2 weight percent and more desirably about 0.1 to 0.8 weight percent relative to meat products.

In the practice of this invention, each of the components of the present composition may be added separately or a mixture of them may be added to meat products. With regard to the procedure of production of the composition according to this invention, the respective components may be admixed as mentioned above and the mixing method is virtually optional. For example, the powders of ascorbic acids, cystine and/or cysteine, and aspartic acid in the specified proportions are evenly blended in a V model-mixer, speed mixer or the like machine. Or the respective components are dispersed or dissolved in water and, after intermixing, the mixture is dried in the conventional manner, e.g. by drum drying, pneumatic conveyer drying, draft air drying, etc., milled and sieved to give a powdery or granular preparation.

In the production of the composition according to this invention, not only the aforementioned starch hydrolyzate but also those other additives and/or auxiliary raw materials which are commonly used in meat products may be simultaneously incorporated in the composition. For example, nitrites, nitrates, polyphosphates (sodium polyphosphate, sodium pyrrophosphate, etc.), common salt, condiments, soybean protein, egg white powder, plasma powder, skim milk powder, mucilage (carrageenan, xanthane gum, etc.) may be added in suitable proportions.

The composition according to this invention may be added to meat products at any optional stage, for example at the raw material stage or an appropriate stage in the production of meat products such as curing, mixing, etc., or for that matter at any desired production stage. For addition to raw meat, for instance, the composition of this invention may be mixed with the raw meat. For addition to a processed food, such as ham, sausage or bacon, the composition of this invention may be added in the stage where auxiliary colors are usually added, such as curing, in the same manner as conventionally practiced, e.g. by the injection, pickling or mixing technique. When curing is not performed, the composition is preferably added at the stage where auxiliary raw materials are incorporated.

When the composition of this invention is used in processed meat foods, it is necessary to add sodium nitrite to raw meat material so as to convert myoglobin to nitrosomyoglobin and, then, carry out the heat treatment to develop the red color. The composition of this invention prevents discoloration of the red color developed by the action of nitrite.

Compared with the meat products manufactured by the conventional technique, the products containing the composition of this invention have a more uniform, satisfactory appearance and are less liable to become discolored upon storage and exposure to light.

Recently there has been on the market an increased amount of pre-sliced ham or bacon, etc., either as they are or as packaged, for the ease of consumption. In a show case, such products undergo discoloration to assume a poor appearance, thus suffering from decreased marketability. Meat products containing the composition of this invention are less liable to become discolored on exposure to light during storage and have better economic values. Moreover, while photo-discolored meat products recover part of their lost color during the nighttime where illumination is not available, addition of the composition of this invention assists remarkably in this recovery of color so that the products may enjoy a better appearance and a higher market value.

The following experimental and working examples are further illustrative of this invention. It should be understood that all percents (%) are by weight unless otherwise indicated.

TEST EXAMPLE 1

60% of minced pork lean meat, 3% of sodium chloride, 0.5% of sodium polyphosphate, 3.5% of starch, 33% of water, an appropriate amount of sodium nitrite and 0.1% of an additive composition shown in Table 1 were mixed together, cured at 5° C. for 18 hours and heated at 75° C. for 60 minutes. The mixture was allowed to stand at 5° C. for 24 hours and its appearance was evaluated by measuring L (luminosity), a (red and green) and b (yellow and blue) with a color-difference meter [Suga Shiken Instruments Co., Ltd., SM-2, Japan]. Thus, samples of the above product were exposed to fluorescent light (40 luxes) for 2 hours or 12 hours at 5° C, then stored in the dark for 48 hours, and using the color difference meter, the values of L, a and b were measured.

The percent residues of a relative to the pre-storage values are shown in Table 1. If there is a difference of 5% in percent residue of a, red color is obviously distinguishing to the naked eye.

It will be apparent from the results shown in Table 1 that the addition of sodium L-ascorbate, cystine and aspartic acid results in a higher percent residue of a and a lower degree of discoloration.

TABLE 1

| Additive composition (weight part) | | | Appearance (residual ratio of a value, %) | |
|---|---|---|---|---|
| Sodium-L-ascorbate | L-cystine | L-aspartic acid | Exposure for 2 hrs to fluorescent light | Exposure for 12 hrs to fluorescent light and storage for 48 hrs in the dark |
| 1 | 0 | 0 | 69 | 55 |
| 1 | 0.1 | 0 | 73 | 61 |
| 1 | 0.2 | 0 | 77 | 67 |
| 1 | 0.5 | 0 | 80 | 71 |
| 1 | 2 | 0 | 78 | 67 |
| 1 | 5 | 0 | 76 | 62 |
| 1 | 0 | 0.1 | 69 | 56 |
| 1 | 0 | 0.2 | 70 | 56 |
| 1 | 0 | 0.5 | 68 | 53 |
| 1 | 0 | 2 | 65 | 50 |
| 1 | 0 | 5 | 61 | 46 |
| 1 | 5 | 0.1 | 81 | 73 |
| 1 | 2 | 0.2 | 84 | 77 |
| 1 | 0.5 | 0.5 | 86 | 79 |
| 1 | 0.2 | 2 | 82 | 74 |
| 1 | 0.1 | 5 | 80 | 72 |

TEST EXAMPLE 2

A lump of beef lean meat was cut in a piece 1 cm thick and 200 g in weight and then an additive composition shown in Table 2 was uniformly dusted on the surface of the test piece. Thus treated test piece was packed in a styrene foam vessel and allowed to stand at 5° C. for 24 hours. Color of the surface of each test piece was evaluated by Rank-order tests using a 20 member panel.

TABLE 2

| Test group | Additive composition | Rank total | Profile of appearance |
|---|---|---|---|
| (1) | Sodium L-ascorbate 400 mg | 60 | discolored |
| (2) | Sodium L-ascorbate 200 mg and L-cysteine 200 mg | 40 | moderately discolored |
| (3) | Sodium L-ascorbate 200 mg, L-cysteine 100 mg and sodium L-aspartate 100 mg (The present | 20 | non-discolored (red color), desirable |

TABLE 2-continued

| Test group | Additive composition | Rank total | Profile of appearance |
|---|---|---|---|
| | invention group) | | |

Note:
(1) a smaller rank total shows deeper red color.
(2) Kramer Table (Significance tests)
significant at 5% when rank total is 32 to 48.
significant at 1% when rank total is 30 to 50.

As is clear from the results of Table 2, the meat treated by a method of the present invention has deeper red color and is highly desirable as compared with those of the control groups (1) and (2).

TEST EXAMPLE 3

A lump of tuna lean meat was cut in a piece 1 cm thick and 200 g in weight and then an additive composition shown in Table 3 was uniformly dusted on the surface of the test piece. Thus treated test piece was packed in a styrene foam vessel and allowed to stand at 0° to 2° C. for 3 days. Color of the surface of each test piece was evaluated by Rank-order test using a 20 member panel.

TABLE 3

| Test group | Additive composition | Rank total | Profile of appearance |
|---|---|---|---|
| (1) | Sodium L-ascorbate 400 mg | 55 | discolored |
| (2) | Sodium L-ascorbate 200 mg and L-cysteine 200 mg | 45 | moderately discolored |
| (3) | Sodium L-ascorbate 200 mg, L-cysteine 100 mg and sodium L-aspartate 100 mg | 20 | non-discolored (red color), desirable |

Note:
(1) A smaller rank total shows deeper red color.
(2) Kramer Table (Significance tests)
significant at 5% when rank total is 32 to 48.
significant at 1% when rank total is 30 to 59.

As is clear from the results of Table 3, the tuna meat treated by a method of the present invention has deeper red color and is highly desirable as compared with those of the control group (1) and (2).

EXAMPLE 1

A composition for preventing discoloration of meat products was produced by mixing 5 kg of sodium L-ascorbate, 4 kg of L-cystine and 1 kg of L-aspartic acid in a micro speed mixer (Takara Machinery Co., Ltd., Japan) for about 2 minutes.

EXAMPLE 2

A composition for preventing discoloration of meat products was produced by mixing 5 kg of sodium erythorbate, 2.5 kg of L-cystine and 2.5 kg of sodium L-aspartate in a micro speed mixer for about 2 minutes.

EXAMPLE 3

A composition for preventing discoloration of meat products was produced by mixing 4 kg of sodium L-ascorbate, 1 kg of L-cystine, 1 kg of L-aspartic acid and 4 kg of a starch hydrolyzate with a DE value of 20 in a micro speed mixer for about 2 minutes.

EXAMPLE 4

A composition for preventing discoloration of meat products was produced by mixing 5 kg of sodium L-ascorbate, 3 kg of L-cysteine and 2 kg of L-aspartic acid in a micro speed mixer for about 1.5 minutes.

EXAMPLE 5

A composition for preventing discoloration of meat products was prepared by mixing 3 kg of sodium L-ascorbate, 1 kg of L-cysteine, 1 kg of L-cystine, 1 kg of L-aspartic acid and 5 kg of starch hydrolyzate (DE 25) in a micro speed mixer for about 1.5 minutes.

EXAMPLE 6

To 400 g of minced pork, 130 g of minced beef, 150 g of lard, 20 g of sodium chloride, 0.1 g of sodium nitrite, 3 g of sodium polyphosphate, 230 g of ice-water, 4 g of sucrose, 2.7 g of sodium L-glutamate, 3 g of natural condiment, 4 g of spice, 1 g of smoke powder, 10 g of egg white powder and 30 g of starch were added either 0.5 g of sodium L-ascorbate and 0.5 g of L-cystine (the L-ascorbate and L-cystine-containing product group) or the same additives plus 1.0 g of the composition of Example 1 (the invention group). Each mixture was milled and filled into polyvinylidene chloride casing with a diameter of 4.5 cm, heated at 80° C. for 40 minutes and cooled to give a sausage.

This sausage was sliced and allowed to stand in indoor scattering light for 2 hours. Appearance examination of slices revealed that the product according to this invention was red with less discoloration as compared with the L-ascorbate and L-cystine-containing product group.

EXAMPLE 7

In 8.2 kg of ice-water were dispersed either 900 g of sodium chloride, 3 g of sodium nitrite, 150 g of sodium polyphosphate, 50 g of sodium L-glutamate, 120 g of sucrose, 300 g of egg white powder and 30 g of spice (the control group) or the same additives plus 40 g of the composition of Example 3 (this invention group) to prepare a pickling liquor. This liquor (300 g) was injected into 1 g of pork ham and after 18-hour tumbling, filled into air-permeable casing, dried at 60° C. for 30 minutes, smoked at 60° C. for 30 minutes, and steam-boiled at 75° C. for 60 minutes to give a roast ham.

This product was stored at 5° C. overnight and sliced and the slices were allowed to stand in indoor scattering light for 3 hours. Appearance examination showed that the product according to this invention was red in color, with less discoloration, and very satisfactory as compared with that of the control group.

EXAMPLE 8

To 1 kg of chopped pork were added either 35 g of sodium chloride, 0.1 g of sodium nitrite, 5 g of sodium polyphosphate, 0.5 g of sodium erythorbate, and 0.5 g of L-cystine (the L-erythorbate and L-cystine-containing product group) or the same additives plus 1 g of the composition of Example 2 (this invention group). Each mixture was cured at 5° C. for 5 days and washed in clean fresh water for 30 minutes. With a pin inserted, the mixture was dried at 60° C. for 80 minutes, smoked for 50 minutes and cooled to give a bacon. This was sliced and vacuum-packed.

The pack of slices was stored at 5° C. for 1 month and the appearance was closely examined. It was found that the product according to this invention had a deeper red color and is very satisfactory as compared with the L-erythorbate and L-cystine-containing product group.

EXAMPLE 9

To 700 g of minced pork, 100 g of lard, 200 g of ice-water, 20 g of sodium chloride, 0.1 g of sodium nitrite, 3 g of sodium polyphosphate, 5 g of condiment, 4 g of spice and 30 g of starch were added 0.5 g of sodium L-ascorbate, 0.3 g of L-cystine and 0.2 g of L-aspartic acid, and the mixture was milled and filled into polyvinylidene chloride casing with a diameter of 4.5 cm. It was then heated at 80° C. for 40 minutes and cooled to give a sausage.

The above sausage was sliced and allowed to stand in indoor scattering light for 2 hours. Appearance examination showed that the product according to this invention was red with less discoloration and very desirable.

EXAMPLE 10

To 400 g of minced pork, 130 g of minced beef, 150 g of lard, 20 g of sodium chloride, 0.1 g of sodium nitrite, 3 g of sodium polyphosphate, 230 g of ice-water, 4 g of sucrose, 2.7 g of sodium L-glutamate, 3 g of natural condiment, 4 g of spice, 1 g of smoke powder, 10 g of egg white powder and 30 g of starch were added either 0.5 g of sodium L-ascorbate and 0.5 g of L-cysteine (the L-ascorbate and L-cysteine-containing product group) or the same additives plus 1 g of the composition of Example 4 (this invention group). Each mixture was milled and filled into polyvinylidene chloride casing with a diameter of 4.5 cm. The filled meat was heated at 80° C. for 40 minutes, and cooled to give a sausage.

This sausage was sliced and allowed to stand in indoor scattering light for 2 hours. Appearance examination revealed that the product according to this invention was red in appearance with less discoloration and very desirable as compared with the L-ascorbate and L-cysteine-containing product group.

EXAMPLE 11

To 8.2 kg of ice-water were added either 900 g of sodium chloride, 3 g of sodium nitrite, 150 g of sodium polyphosphate, 50 g of sodium L-glutamate, 120 g of sucrose, 300 g of egg white powder and 30 g of spice (the control group) or the same additives plus 70 g of the composition of Example 5 (this invention group) to prepare a pickling liquor. This liquor (300 g) was injected into 1 kg of pork ham and, after tumbling, the pork was filled into air-permeable casing, smoked at 60° C. for 30 minutes and steam-boiled at 75° C. for 60 minutes to give a roast ham.

The above product was stored at 5° C. overnight and sliced, and the slices were allowed to stand in indoor scattering light for 3 hours. Appearance examination showed that the product according to this invention was red with less discoloration and highly desirable as compared with the control product group.

EXAMPLE 12

Ten ml of the solution shown in Table 4 was sprayed on a duck meat of 200 g. The meat was packed in a styrene foam vessel and allowed to stand at 5° C. for 2 days. As a result, the meat treated by a method of the present invention was deeper red in appearance and highly desirable as compared with that of the control group.

TABLE 4

| | Composition of solution |
|---|---|
| Control group | aqueous solution composed of 2% of sodium L-ascorbate and 2% of L-cystine |
| The present invention group | aqueous solution composed of 2% of sodium L-ascorbate, 1% of L-cystine and 1% sodium aspartate |

EXAMPLE 13

A composition for preventing discoloration of meat products was produced by mixing 2.5 kg of sodium L-ascorbate, 1.5 kg of L-cystine, 1.6 kg of sodium L-aspartate, 1.1 kg of lactose and 3.3 kg of starch hydrolyzate (DE 20) in a micro speed mixer for 2 minutes. A roast ham was produced using the above composition by a similar method shown in Example 7.

Thus obtained product was stored at 5° C. overnight and sliced and the slices were allowed to stand in indoor scattering light for 3 hours. Appearance examination showed that the product was red in color with less discoloration, and very satisfactory.

What we claim is:

1. A method for preventing discoloration of meat products which comprises incorporating into meat products (a) ascorbic acids, (b) cystine and/or cysteine and (c) aspartic acid.

2. The method according to claim 1, wherein a starch hydrolyzate with a dextrose equivalent of 5 to 30 is additionally into the meat products.

3. The method according to claim 2, wherein the proportion of the starch hydrolyzate is about 0.2 to 8 weight parts relative to one weight part of ascorbic acids.

4. The method according to claim 1, wherein the proportions of ascorbic acids, cystine and/or cysteine, and aspartic acid are about 0.1 to 5 weight parts of cystine and/or cysteine, and about 0.1 to 5 weight parts of aspartic acid relative to one weight part of ascorbic acids.

5. The method according to claim 1, wherein the level of addition of ascorbic acids is about 0.02 to 0.1 weight percent relative to the meat products.

6. A composition for preventing discoloration of meat products, said composition comprising (a) ascorbic acids (b) cystine and/or cysteine, and (c) aspartic acid.

7. The composition according to claim 6, further comprising a starch hydrolyzate with a dextrose equivalent of 5 to 30.

8. The composition according to claim 7, wherein the proportion of the starch hydrolyzate is about 0.2 to 8 weight parts relative to one weight part of ascorbic acids.

9. The composition according to claim 6, wherein the proportions of ascorbic acids, cystine and/or cysteine, and aspartic acid are about 0.1 to 5 weight parts of cystine and/or cysteine, and about 0.1 to 5 weight parts of aspartic acid relative to one weight part of ascorbic acids.

* * * * *